Aug. 26, 1952 P. TARUFFI 2,608,264
RACING CAR
Filed Oct. 12, 1949
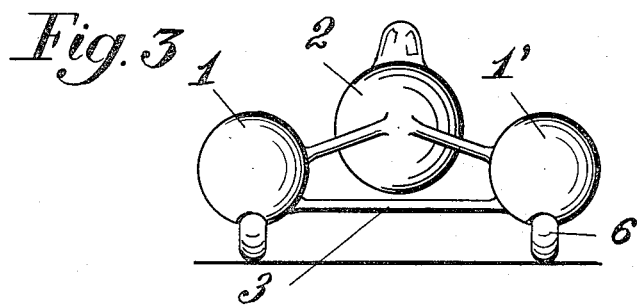
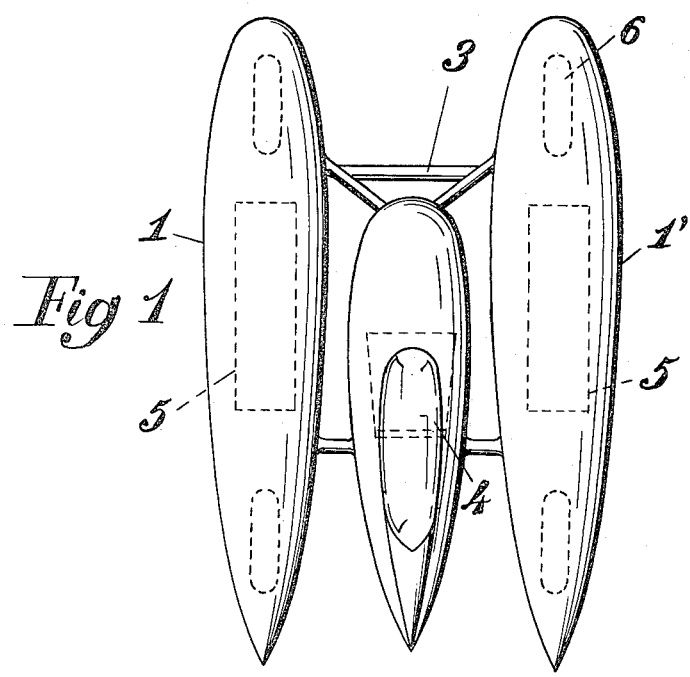
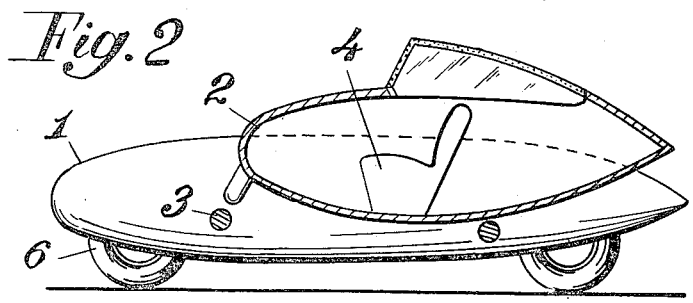
INVENTOR.
Piero Taruffi
BY Patented Aug. 26, 1952

2,608,264

UNITED STATES PATENT OFFICE 2,608,264

RACING CAR

Piero Taruffi, Rome, Italy

Application October 12, 1949, Serial No. 120,843
In Italy October 23, 1948

5 Claims. (Cl. 180—89)

1

The present invention relates to a motor car which is quite different from the frame or body of the standard motor vehicles known up to the present.

The car substantially consists of three parallel elongated streamlined parts, disposed with their length in the direction of motion; the said parts are so placed that the axes of two of them lie on the same horizontal plane, whilst the axis of the third lies on a plane placed higher than the one afore mentioned, and on the vertical longitudinal plane of symmetry of the whole unit at the same time; or on another parallel plane situated not far from it. Therefore the intersection of those three axes with a perpendicular plane consists of three points, vertices of a triangle which has its base downwards.

The control devices, the motors, the driver and the eventual passengers will be placed in the afore mentioned three parts so as to provide a streamlined vehicle, having better stability and handiness than the standard vehicles known up to the present, on account of the weights being placed prevailingly towards the midst of the unit and the driver's seat being displaced towards the rear end of the car.

A motor set is designed for the present invention, consisting of two twin motors placed in the two lateral elongated bodies which conceal the four wheels within their outline at least for the major part. Each motor is placed between the two wheels so that their weight has a very low centre of gravity and a small moment of inertia in respect of the vertical axis passing from the centre of gravity. All this allows a better stability and handiness of the vehicle to be attained.

The driver and the eventual passengers as well as the control devices are placed in the central part which is displaced towards the rear end of the car so as to allow a better driving position to be had for the driver on curved lines and to displace the air pressure towards the rear end of the vehicle as well.

The whole unit consists of the three afore mentioned parts, one being rigidly connected with the other.

The preferred form for the three parts is a mainly streamlined form: the torpedo form for instance or whatever other form which will best reduce the resistance to motion and assure the maximum possible internal room for the motors at the same time.

The racing motor car will thus consist of three streamlined parts, one rigidly connected with the other by means of connecting members which can be tubes, cross bars or other adequately shaped connecting members.

The present invention has in fact for its object to provide a motor car having a minimum frontal section, the best coefficient of form and a low placed centre of gravity in which the passenger's and driver's seats are placed far from the motor unit and lifted from the ground so as to give the best visibility; the maximum possible room is moreover at disposal for the motor unit and the control devices.

It is known in fact that the resistance to travel for a car travelling on a road is due to its main section, to the coefficient of form, to the reciprocal distance of the parts, and to the distance and form of the parts which are placed nearest to the ground surface.

The present invention provides a frame or body which allows the part where the passengers and driver's seat are placed to be situated at a distance from the ground whilst the other two parts where the motors are placed and the wheels concealed have a streamlined form, preferably a torpedo form, having a minimum frontal section; even the section of the vehicle which faces the ground is highly reduced.

The accompanying drawing shows a construction of the invention in an illustrative manner and not as limiting the invention. In these drawings:

Fig. 1 shows the vehicle in plan.

Fig. 2 shows a longitudinal sectional plan of the vehicle taken on its central axis.

Fig. 3 shows a front view of the vehicle.

In the drawings the whole frame is schematically shown, the accessory parts, the mechanical transmissions and all the elements which are not main members and can be designed in different ways according to standard technical knowledge, known up to the present, not being shown.

The frame of the vehicle consists of three elongated bodies 1, 1', and 2. The two parallel parts 1 and 1' have parallel axes disposed in the direction of motion and placed on the same horizontal plane. The part 2 has a minor length than the other two and is placed between them at a superior height. The three parts 1, 1', 2 are rigidly connected one with the other by tubes or cross members, which constitute the connecting members and if hollow, the control transmission members can be set within them. It is evident that the central body 2 may be connected with the lateral parts 1 and 1' by means of a continuous frame which covers the afore said connecting members or takes their place.

The wheels 6 are concealed by the parts 1 and 1'; the two right wheels being placed within one of them, the two left wheels within the other. It is evident that if the wheels are more than four all the wheels placed on the right side will be concealed by one elengated body and all those placed on the left side of the vehicle by the other. The wheels project from the bodies to the minimum possible extent allowed by the spring suspension. One motor 5 is placed in each of the two bodies 1 and 1' set between the two wheels concealed in it so that the centre of gravity lies as low as possible, as aforesaid, and the moment of inertia, calculated with regard to the vertical axis passing from the centre of gravity of the vehicle has a minimum value as well as the frontal section of the body within which the motor is set. The motors are connected by a transverse connecting member.

Inserting and disengaging devices will be designed for the said transmission so that the transmission of motion might be carried into effect by each of the motors independently.

The passengers and driver and the control devices are placed in the body 2. The driver's cab 2 may have different shapes and dimensions according to the number of seats which must be placed in it as well as to the stability conditions of the whole unit, to the scope of the vehicle and to the maximum designed speed.

It is evident that the shape and position of the body 2 with regard to the parts 1 and 1' will be designed so as to give the best visibility and driving conditions for the driver. It must be noted that the connecting members may be shaped so as to have a reduction of the resistance to motion and be partly or wholly concealed within cases suitably connected with the lateral bodies.

Having now particularly described and ascertained the nature of my said invention and in what manner the same is to be performed, I declare that what I claim is:

1. An automobile comprising, in combination, three hollow body portions each of which has a streamlined outer configuration, two of said hollow body portions being substantially identical and located on opposite sides of the vehicle and the third hollow body portion being located between said two identical hollow body portions, the said third hollow body portion being of a shorter length than said two identical hollow body portions and being located in a substantially raised position with respect to said two identical body portions and rearwardly of the front ends of said two identical hollow body portions and the outer surfaces of each of said two identical hollow body portions on the sides thereof distant from said third hollow body portion being continuous from the front end to the rear end of each of said two identical hollow body portions; a plurality of bar members fixedly interconnecting the said three hollow body portions so as to provide relatively large spaces therebetween; and four wheel members for supporting the vehicle for rolling movement, the said wheel members being rotatably mounted in the front and rear ends of said two identical hollow body portions, respectively.

2. An automobile comprising, in combination, three hollow body portions each of which has a streamlined configuration, two of said hollow body portions being substantially identical and located on opposite sides of the vehicle and the third body portion being located between and connected to said two identical hollow body portions, the said third hollow body portion being of a shorter length than said two identical hollow body portions and being located rearwardly of the front ends of said two identical hollow body portions and in a substantially raised position with respect to said two identical hollow body portions, a portion of the outer surface of said third body portion being transparent so as to permit the vehicle to be controlled from said body portion; a plurality of bar members fixedly interconnecting the said three hollow body portions so as to provide relatively large spaces therebetween; four wheel members for supporting the vehicle for rolling movement, the said wheel members being rotatably mounted in the front and rear ends of said two identical hollow body portions, respectively, and substantially less than one half of said wheel members projecting from said two identical hollow body portions; and a pair of engines for driving the said wheel members, the said engines being centrally located in each of said two identical hollow body portions, respectively, between the wheel members located at the front and rear ends of said identical hollow body portions, so as to substantially balance the vehicle and so as to provide the vehicle with a low center of gravity.

3. An automobile comprising, in combination, three transversely spaced separate hollow bodies, each of which has a streamlined outer configuration, two of said hollow bodies being substantially identical and located on opposite sides of the vehicle and the third hollow body being located between said substantially identical bodies; a plurality of transverse bar members connecting said identical hollow bodies with said third hollow body and supporting said third body in spaced, substantially parallel relation between said identical bodies; a plurality of connecting bar members connecting said identical hollow bodies together and maintaining said identical bodies in spaced and substantially parallel relation; four wheel members for supporting the vehicle for rolling movement, the said wheel members being rotatably mounted in the front and rear ends of said two identical hollow bodies, respectively; and a pair of engines for driving the said wheel members, the said engines being substantially centrally located in each of said two identical hollow body portions, respectively, between the pair of wheel members located at the front and rear ends of each of said identical hollow bodies.

4. An automobile comprising, in combination, three transversely spaced separate hollow bodies, each of which has a streamlined outer configuration, two of said hollow bodies being substantially identical and located on opposite sides of the vehicle and the third hollow body being located between said substantially identical bodies; a plurality of transverse bar members connecting said identical hollow bodies with said third hollow body and supporting said third hollow body in substantially raised position with respect to said two substantially identical hollow bodies and in spaced and substantially parallel relation between said identical bodies; a plurality of connecting bar members connecting said identical hollow bodies together and maintaining said identical bodies in spaced and substantially parallel relation; four wheel members for supporting the vehicle for rolling movement, the said wheel members being rotatably mounted in the front and rear ends of said two identical hollow bodies, respectively; and a pair of engines for driving the said wheel members, the said engines being substantially centrally located in each of said two identical hollow body portions, respectively, between the pair of wheel members located at the front and rear ends of each of said identical hollow bodies.

5. An automobile comprising, in combination, three transversely spaced separate hollow bodies, each of which has a streamlined outer configuration, two of said hollow bodies being substantially identical and located on opposite sides of the vehicle and the third hollow body being located between said substantially identical bodies and being of shorter length than said two identical hollow bodies and being located rearwardly of the front ends of said two identical hollow bodies; a plurality of transverse bar members connecting said identical hollow bodies with said third hollow body and supporting said third body in spaced, substantially parallel relation between said identical bodies; a plurality of connecting bar members connecting said identical hollow bodies together and maintaining said identical bodies in spaced and substantially parallel relation; four wheel members for supporting the vehicle for rolling movement, the said wheel members being rotatably mounted in the front and rear ends of said two identical hollow bodies, respectively; and a pair of engines for driving the said wheel members, the said engines being substantially centrally located in each of said two identical hollow body portions, respectively, between the pair of wheel members located at the front and rear ends of each of said identical hollow bodies.

PIERO TARUFFI.

REFERENCES CITED

The following references are of record in the file of this patent:

UNITED STATES PATENTS

| Number | Name | Date |
|---|---|---|
| D. 82,044 | Martin | Sept. 16, 1930 |
| D. 115,854 | Loudy | July 25, 1939 |
| D. 120,187 | Silverstein | Apr. 23, 1940 |
| 1,822,775 | Henninger | Sept. 8, 1931 |
| 2,030,548 | Smeets | Feb. 11, 1936 |
| 2,132,450 | Wolf | Oct. 11, 1938 |